United States Patent [19]

Hoeman et al.

[11] 4,054,158

[45] Oct. 18, 1977

[54] INSULATED PIPE STRUCTURE

[75] Inventors: Terry E. Hoeman; Douglas D. Fockler, both of Lancaster, Ohio

[73] Assignee: The Babcock & Wilcox Company, New York, N.Y.

[21] Appl. No.: 479,330

[22] Filed: June 14, 1974

[51] Int. Cl.² ............................................. F16L 9/22
[52] U.S. Cl. ................................. 138/155; 138/148; 138/DIG. 10; 285/47; 285/302
[58] Field of Search ............... 138/148, 155, DIG. 10; 285/47, 302

[56] References Cited

U.S. PATENT DOCUMENTS

| 360,782 | 4/1887 | Ober | 138/148 X |
|---|---|---|---|
| 563,775 | 7/1896 | Lantzke | 138/148 X |
| 634,344 | 10/1899 | Henning | 285/302 X |
| 683,514 | 10/1901 | Stephens | 138/148 |
| 1,411,960 | 4/1922 | Doins | 138/148 |
| 1,838,242 | 12/1931 | Wilson | 138/148 X |
| 1,913,180 | 6/1933 | Weber | 138/148 X |
| 2,013,193 | 9/1935 | Stadtfeld | 138/148 X |
| 3,282,011 | 11/1966 | Meserole et al. | 138/148 X |
| 3,807,777 | 4/1974 | Larkin | 285/302 |

FOREIGN PATENT DOCUMENTS 2,008,455  9/1971  Germany .............................. 138/148

*Primary Examiner*—Richard C. Queisser
*Assistant Examiner*—Charles Gorenstein
*Attorney, Agent, or Firm*—J. M. Maguire; J. P. Sinnott

[57] ABSTRACT

An illustrative embodiment of the invention is directed to a thermally insulated exhaust duct structure. In this regard, a typical duct comprises an inner stainless steel conduit and one or more sheets of highly-reflective material that are spirally wrapped around and spaced outwardly from the outer surface of the conduit. The adjacent layers of the sheet material, moreover, are spaced from each other a predetermined distance through corrugated strips that are fastened to one side of the sheet material. Thus, when wound about the conduit in an overlaying relationship, the corrugation peaks bear against the sheet of material that is immediately below and thereby estabish a spacing between adjacent layers that is at least equal to the depth of the corrugations. Other features of the inventon include an outer protective stainless steel casing that fits over the spirally wrapped insulating sheet and a roof penetration for the duct structure.

1 Claim, 4 Drawing Figures

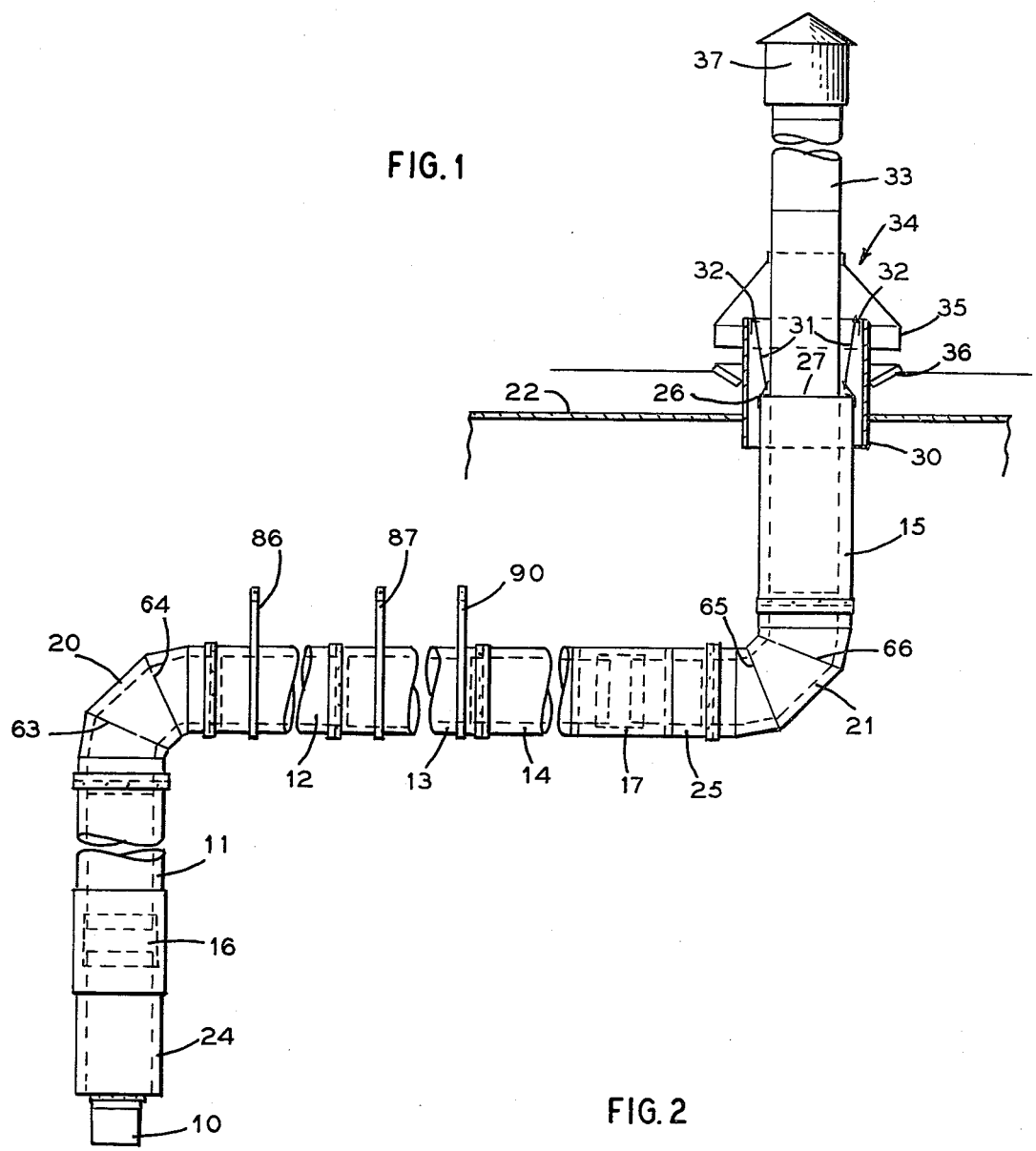
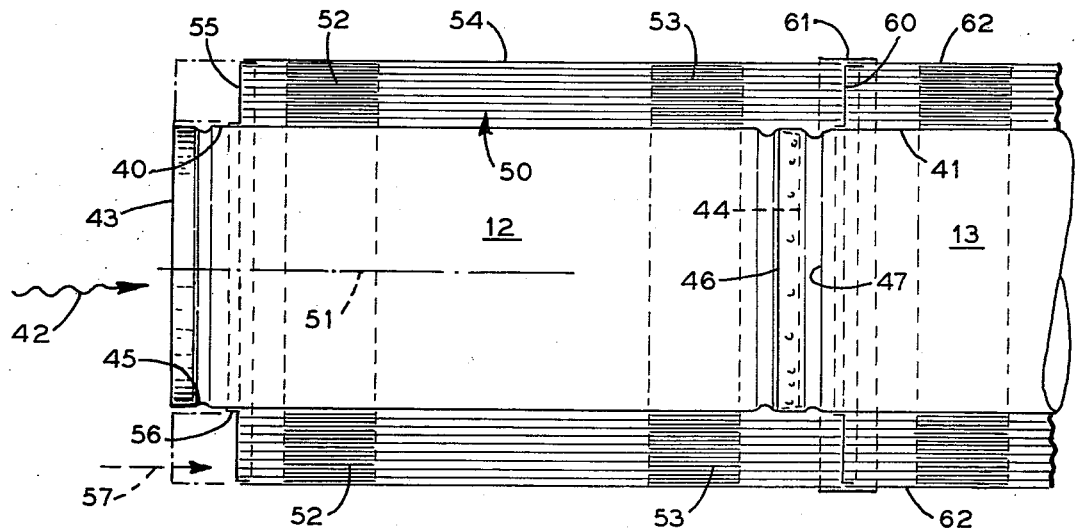

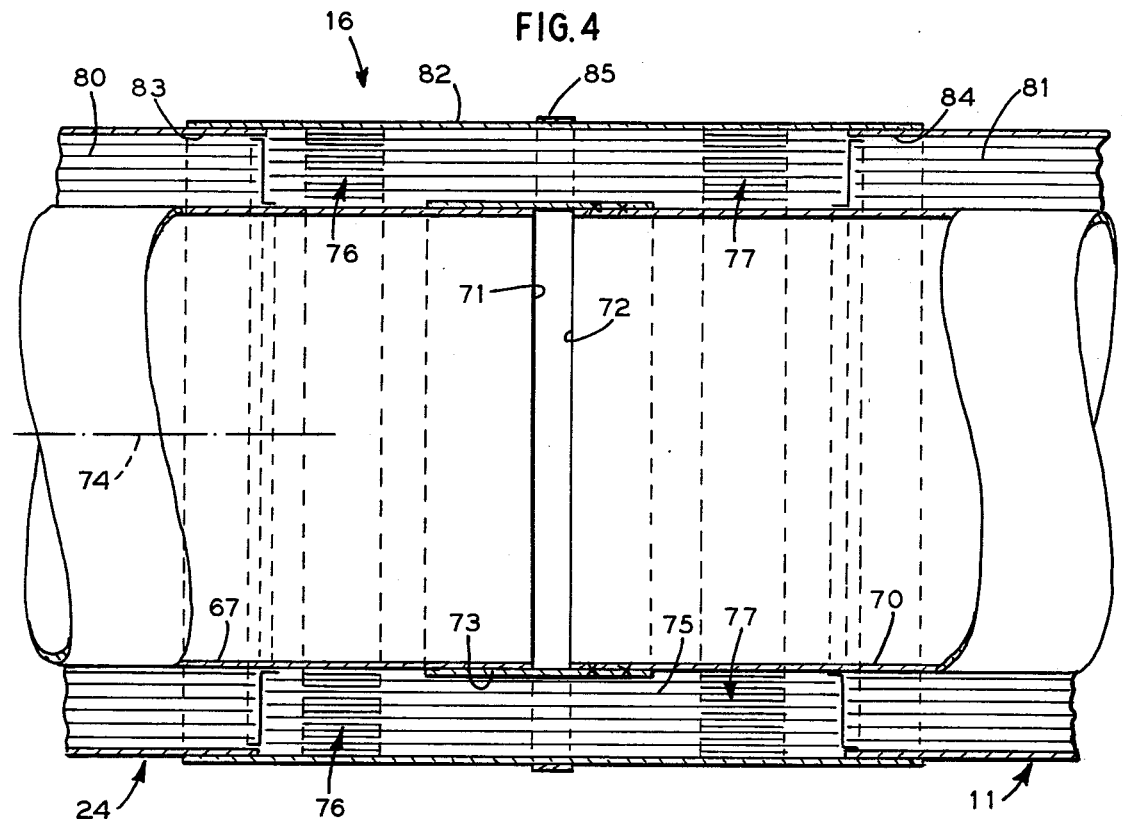
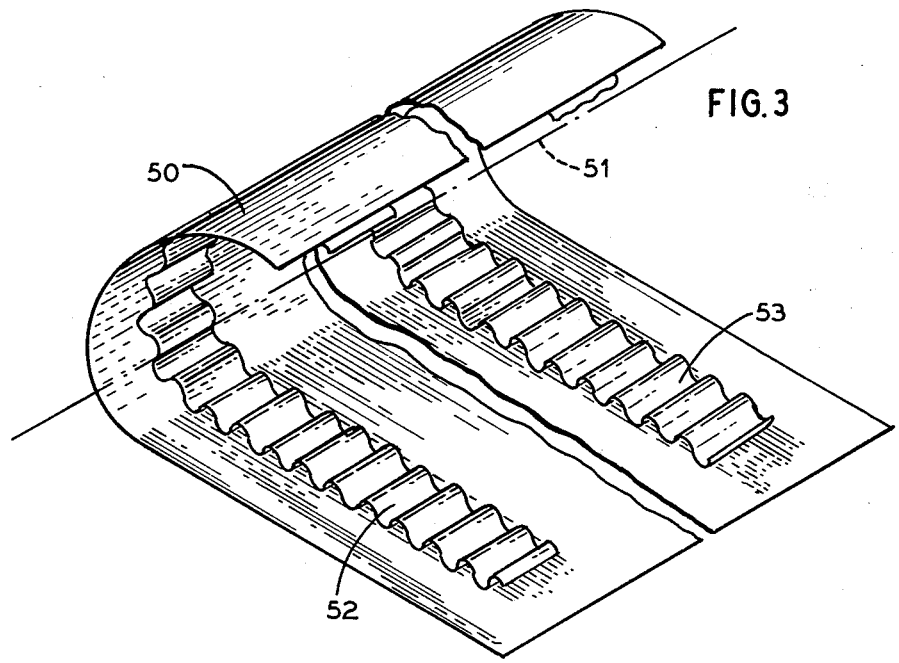

INSULATED PIPE STRUCTURE

BACKGROUND OF THE INVENTION

1. Field of the Invention

This invention relates to insulation techniques and more specifically to methods and apparatus for high reflectivity thermal insulation in exhaust ducts, and the like.

2. Description of the Prior Art

Stacks, flues, chimneys, and the like are common industrial and domestic devices. Because these duct structures frequently are used to promote gas to flow from a furnace or oven to the atmosphere for safe dispersal, it often has been necessary to insulate these ducts thermally in order to protect lives and property from fire or heat damage. Masses of fibrous material, or "lagging", that has a low thermal conductivity, usually is placed over the ducting. These materials reduce the surface temperature of the duct structure to some relatively safe level.

Although these materials provide generally effective thermal protection, they are, nevertheless, subject to a number of disadvantages. This fibrous lagging, for example, deteriorates with the passage of time and with exposure to high temperatures and thermal cycling. Naturally, this deterioration must be arrested through relatively frequent patching and painting. There also is a certain amount of dust and debris that is associated with fibrous thermal insulation. This particulate matter, moreover, can present very serious sanitary problems and health hazards, if the insulation is used in a bakery or other type of food processing plant, because the fines can be incorporated in the foodstuffs.

Installing these fibre-insulated stacks also requires the services of at least two classes of costly skilled labor-tinsmiths for assembling the duct and "insulators" for installing the lagging.

Clearly, there is a need for insulated ducting that is clean, simple to install, and suitable for long years of essentially maintenance-free operation.

SUMMARY OF THE INVENTION

These and other problems that have characterized prior duct insulation techniques are overcome, to a large extent, through the present invention. Illustratively, a thermally insulated duct that embodies features of the invention has an inner conduit that is in contact with and directs the flow of the hot gasses in question. One transverse end of the conduit has a female coupling and the other transverse end of the conduit has a tapered male coupling for insertion in gas-tight relation within the female coupling on the conduit in the adjacent duct segment.

In accordance with a characteristic of the invention, at least one layer or serving of high reflectivity foil or sheet material is wrapped around the outer surface of the conduit in a generally spiral path that increases in distance, or radius, from the surface of the conduit to the outermost spiral layer. Spacers are fixed to one surface of the foil to insure that each layer of the foil, when spirally wound, is separated a predetermined distance from the next adjacent layer. These spaced layers of the sprially wound foil provide a reflective insulation that effectively attenuates the flow of heat from the gases within the conduit to the outer casing. The conduit and spirally wound foil assembly is enclosed in a sturdy casing in order to protect the insulation during handling installation and use.

The spirally wound foil is not fastened to the inner conduit but is, instead, capable of accommodating a limited amount of sliding movement in a direction that is parallel to the longitudinal axis of the conduit. The would foil on a "starter" assembly, moreover, is shorter than the underlaying conduit by about the length of the duct's roof penetration. This feature of the invention has specific advantages. For example, when joining continuous sections of exhaust ducting, the spirally wrapped layers of thermal insulation on each successive conduit can be moved in a longitudinal direction through a distance that is about equal to the roof penetration gap on the "starter" assembly in order to abut a transversely disposed flange that is adjacent to the transverse end of the spiral roll of insulation on the adjoining conduit. This enables the insulation to bridge across the gap that otherwise would have been formed in the vicinity of the joint and to essentially shift the bare end of the inner conduit up to the actual roof penetration.

In almost any industrial installation, a certain amount of stack gas temperature cycling is to be anticipated. To cope with the exhaust duct thermal expansions and contractions that necessarily must accompany these gas temperature fluctuations, expansion joints are provided at appropriate intervals in the duct structure. An expansion joint that is suitable for use in connection with the invention is assembled by establishing a gap between the unjoined ends of two axially aligned adjacent conduits. A snugly fitting annular sleeve overlaps the outer surfaces of the adjacent terminal portions of the two conduits in order to bridge across this gap. The sleeve, however, is fastened only to one of the two adjacent conduits. Thermal insultion also is provided for the gap and sleeve structure through a spiral winding of one or more sheets of reflective insulation. The expansion gap reflective winding extends between the opposing transverse flanges that terminate the insulating material on the adjacent duct sections. The reflective insulation in the thermal expansion gap is protected by means of a hollow cylindrical casing that covers the gap insulation and extends over adjacent portions of the protective casings on opposite sides of the expansion joint.

Preferably, the entire duct is supported within a building, or the like, through an array of straps and vent hood. A typical vent hood has an annular cylinder of a diameter that is greater than the diameter of the duct casing. This cylinder penetrates the building or roof structure. A flange, secured to the upper edge of the vent hood cylinder, provides a means for securing a group of downwardly depending rods. The lower ends of the rods are received in respective, individual gussets that are attached to the terminal end of the thermal insulation that protrudes into the vent hood cylinder. This depending rod structure enables wind stresses and the forces that are generated during the thermal expansion and contraction of the duct to be sustained or accommodated without imposing some damage to the exhaust stack.

Clearly, a duct structure in accordance with the principles of the present invention does not generate a residue of potentially harmful dust or fines. The metallic character of the duct is proof against deterioration through age, thermal exposure and the like. A duct that characterizes the present invention also is suitable for manufacture in a central production facility on an assembly line, thereby making the economies of mass production available in an industry that heretofore has been characterized by custom work with highly skilled classes of labor. The novel structure that exemplifies the present invention is suitable for swift assembly in the field with minimum use of expensive skilled labor. In use, moreover, a duct structure that embodies the present invention may enjoy as much as 40 years of maintenance and thermal degradation-free service.

The various features of novelty which characterize the invention are pointed out with particularity in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

BRIEF DESCRIPTION OF THE DRAWING

FIG. 1 is a side elevation of a typical duct in accordance with the principles of the invention;

FIG. 2 is a side elevation in full section of an illustrative thermally insulated duct segment that is suitable for use in the installation shown in FIG. 1;

FIG. 3 is an isometric view of a foil for use in the duct segment that is shown in FIG. 2; and FIG. 4 is a side elevation in full section of a typical expansion joint for use in connection with the invention.

DETAILED DESCRIPTION OF THE PREFERRED EMBODIMENTS

For a more complete appreciation of the invention, attention is invited to FIG. 1 which shows an illustrative exhaust stack that has a fan 10 for blowing exhaust gases through the stack in order to dissipate these gases in the atmosphere.

As shown in the drawing, the exhaust stack comprises a number of insulated stack segments 11, 12, 13, 14, 15. These segments are of the same size and dimensions in order to apply the economies of mass production to stack erection through manufacture of "standard" components on a plant assembly line and, moreover, to limit costly field assembly to a minimum. Typically, each of these segments is about 5 feet long and has an overall outside diameter of approximately 16 inches.

Expansion joints 16 and 17 are introduced into the exhaust stack span to accommodate the thermal expansion and contraction of the stack structure that necessarily must attend the channeling of hot gases to the atmosphere. Ninety degree turns or "ells" 20 and 21 also are a part of the illustrative stack to match the structural demands of the building (shown in FIG. 1 only as a roof 22) to the location of the exhaust gas source, e.g. a bakery oven, within the building. Although the invention is, in some ways, characterized through a maximum use of insulated stack segments of uniform sizes, it is quite likely that specific plant arrangements will require one or more specially fitted insulated segments to adapt a span of uniform size segments to the dimensions of the particular installation. Toward this end custom-fitted insulated segments 24 and 25 are coupled to the stack structure.

In accordance with a further feature of the invention, the vertically disposed exhaust stack segment 15 penetrates the roof 22. The stack segment 15 has an array of radially disposed gussets 26 that are welded to a stainless steel flange 27 that is transverse to the longitudinal axis of the segment 15 and terminates the thermal insulation for the segment 15. A hollow cylindrical collar 30 that has an inner diameter which is greater than the outside diameter of the stack segment 15 vertically overlaps this terminal portion of the insulation. The collar 30 is secured in the roof 22 and supports a group of circularly disposed vertical and inwardly oriented rods 31. the rods 31 each are secured to a respective flange 32 that is fixed to the top, inside edge of the collar 30. The radially inward disposed ends of these rods, moreover, are fastened each to a respective one of the gussets on the flange 27.

Thus, the rods 31 each bear a distributed portion of the load that is imposed by the stack structure and support the stack within the collar 30 in a manner that further accommodates wind, seismic and other anticipated loadings. The vertical portion of stack 33 that is external to the roof 22 is not provided with reflective insulation. A vent hood 34 has inverted frustro-conical member 35 that terminates in a vertically disposed cylindrical skirt. A dish-shaped flange 36 attached to the outer surface of the cylinder 30. The flange 36 is spaced below the member 35 in order to bear against the uppermost portion of the surface of the roof 22 and further support the load imposed by the stack structure on the cylinder 30. This vent hood, moreover, provides a degree of protection from the elements.

The top of the external stack portion 33 terminates in an exhaust structure 37 which performs the usual function of preventing rainwater and the like from entering the stack.

As shown in FIG. 2, the reflective insulation for the two adjacent horizontally disposed exhaust stack segments 12 and 13 have conduits 40 and 41, respectively, that carry hot exhaust gases in the direction of arrow 42. The longitudinal ends of the conduit 40 terminates in oppositely disposed transverse ends 43 and 44. The transverse end 43 is a female coupling that has a diameter which is essentially the same as the outside diameter of the conduits 40 and 41. A stop 45 that is spaced axially from the female coupling is swaged or otherwise formed in the surface of the conduit 40. The end 44, moreover, is a male coupling that has been worked or swaged to form a conical taper that will be received within a matching female coupling on transverse end 46 of the adjacent conduit 41.

As shown in the drawing, the mated conduits 40 and 41 establish a continuous channel for gas flow through a portion of the stack structure. Preferably, Type 304 stainless steel that is about 0.048 inches thick should be used to construct the conduits 40 and 41. A stop 47 also is formed adjacent to a female coupling on transverse end 46 of the conduit 41 that mates with the male coupling on the end 44 of the conduit 40. The stop 47 limits the penetration of the end 44 into the conduit 41. With the end 44 fully seated within the female coupling on the end 46, the two conduits 40 and 41 are fastened securely together through spot welding, sheet metal screws, or the like.

In accordance with a salient aspect of the invention, a single sheet of reflective aluminum foil 50 is wrapped around the outer surface of the conduit 40 to provide about eight layers or servings of foil. As illustrated in FIG. 2, the foil wrapping is generally parallel to longitudinal axis 51 of the conduits 40 and 41 and establishes an essentially spiral configuration in a plane that is perpendicular to the axis 51. The superposed foil layers are spaced from each other in order to establish an air gap that further attenuates heat transfer from the conduits 40 and 41 to the atmosphere surrounding the stack structure. To establish this spacing between the foil layers, corrugated foil spacers 52 and 53 are fixed to one of the surfaces of the foil 50.

In this respect, attention is invited to FIG. 3 of the drawing which shows the sheet of high reflectivity aluminum foil 50 and the two latterally spaced strips of corrugated foil 52 spot welded or fastened in some other suitable manner to one of the two reflective surfaces of the foil 50. As shown in FIG. 3, the corrugated foil spacers 52 and 53 are strips of uniformly rippled material in which the crests and troughs that form the corrugations or ripples all have essentially the same dimensions. The spacing between these crests and troughs also is of a generally uniform nature. Thus, as the foil 50 is wrapped about the conduit 40 (not shown in FIG. 3) with the longitudinal axis 51 as a center, the crests of the corrugated spacers 52 and 53 serve to provide the appropriate vertical separation between the adjacent layers or servings of the foil 50.

To protect the foil insulation, an outer casing 54 (FIG. 2) encloses the outermost foil layer. Preferably, Type 304 stainless steel about 0.025 inches thickness is suitable for casing use. Illustratively, the casing 54 is a hollow cylindrical sleeve that fits over the outer-most serving of the spirally wound foil 50. The casing 54 has a radially disposed annular flange 55 that is transverse to the longitudinal axis 51 of the conduit 40. The flange 55, moreover, is positioned adjacent to the end 43 of the conduit 40. A short cylindrical portion 56 forms the center of the annulus in the flange 55. The cylindrical portion 56 engages the outer surface of conduit 40 in a snug fit that nevertheless permits the flange 55 to slide in directions that are parallel to the orientation of the axis 51. The flange 55 abuts the edge of the roll of insulating foil 50 that is spaced from the end 43 on the conduit 40. Further, the circumference of the flange 55 terminates in a shoulder that fits snugly within the casing 54. In this respect, it is preferable to weld or fasten the shoulder of the flange 55 to the inner surface of the casing 54 to enable the flange 55, the spirally wrapped foil 50 and the casing 54 to be moved as an integral unit in an axial direction that is parallel to the longitudinal axis 51 of the conduit 40. Further in this regard, it should be noted that the transverse end of the spirally wrapped foil 50 that is adjacent to the end 44 of the conduit 40 is not equipped with a counterpart to the flange 55 that is close to the end 43 of the conduit 40. Thus, to complete the assembly of the two adjacent exhaust stack segments 12 and 13 the male coupling on the end 44 of the conduit 40 is inserted into the female coupling on the end 46 of the conduit 41. The two couplings are fastened together and the integral insulation combination of the flange 55, the spirally rolled foil 50 and the casing 54 is moved in the direction indicated by arrow 57 until the insulation abuts a radially disposed annular flange 60 that provides a transverse termination for the thermal insulation that is associated with the conduit 41. With the thermal insulations and casings for the conduits 40 and 41 in the abutting relation that is shown in FIG. 2, a circumferential strip 61 is wrapped around the outer casing 54 and an outer casing 62 for the conduits 40 and 41, respectively, to bridge across the plane of contact between the two conduit insulations. Preferably, the circumferential strip 61 is spot welded or otherwise fastened to the casings in order to provide a secure joint that tends to reduce heat flow through the plane of contact between the two abutting insulations.

Turning once more to FIG. 1, the ells 20 and 21 are manufactured in a manner that is similar to that which is described in connection with the stack segment 12. The angular relation between the individual portions of the ells, however, is provided by cutting a cylindrical stack segment at appropriate angles to the segment's longitudinal axis in order to produce the angular surfaces that are needed for miter joints 63, 64, 65, and 66.

As hereinbefore mentioned, thermal expansion and contraction of the exhaust stack structure is accommodated through the illustrative expansion joints 16 and 17. The construction of a typical expansion joint 16 for use in connection with the invention is shown in FIG. 4 of the drawing. Thus, conduits 67 and 70 that channel gases through the stack structure are disposed within the two adjacent and vertically oriented stack segments 24 and 11 that are shown in FIG. 1. The conduits 67 and 70 terminate in oppositely oriented transverse ends 71 and 72. The opposing pipe ends 71 and 72, moreover, are spaced from each other in a direction that is parallel to longitudinal conduit axis 74 to establish a gap or interval of about one inch. This gap enables the conduits 67 and 70 to expand and contract in the direction of the axis 74 in response to the temperatures of the stack gases in a manner that avoids a physical contact between the ends 71 and 72 that otherwise might damage the stack segments.

To prevent gas from escaping through this gap, a snugly fitting collar 73 is placed over the outer surfaces of the conduits 67 and 70 in the vicinity of the ends 71 and 72. The collar 73 is welded or suitably fastened to the outer surface of the conduit 70 but engages the outer surface of the conduit 67 in a sliding fit that permits the collar 73 and the conduit 67 to move relative to each other in a direction that is generally parallel to the axis 74.

In order to thermally insulate the expansion joint 16, a spiral winding of foil 75 with corrugated spacers 76 and 77 is wrapped around the expansion joint in the space formed between the terminal portions of thermal insulations 80 and 81 that are associated with the conduits 67 and 70 in the respective stack segments 24 and 11.

A protective outer casing 82, preferably formed from 0.048 inch thick Type 304 stainless steel, completes the thermal expansion joint 16. The casing 82 has an inside diameter that is only slightly greater than the outside diameter of the casings that are associated with the stack segments 24 and 11. This slightly greater diameter permits the expansion joint casing 82 to cover the spirally wound foil 75 and bridge across this foil in order to overlap the terminal portions of the thermal insulations 80 and 81 for the stack segments 24 and 11, respectively. The expansion joint outer casing 82 is not directly fastened to underlying casing portions 83 and 84 of the respective thermal insulations 80 and 81. The expansion joint casing 82 is, instead, secured through a band 85 that circumscribes and is drawn up against the outer surface of the casing 82.

Illustratively, the conduits are formed from 0.048 inch thick 18 gauge stainless steel and the casings described herein also are formed from 0.025 inch thick Type 304 stainless steel. The reflective foils, in contrast, can be made from conventional aluminum foil.

In operation the uniform exhaust stack segments 11 through 15, inclusive, are manufactured in a centrally located production facility. In a similar manner, the ells 20 and 21 and the vent hood structure also are manufactured "off-site" to take advantage of all possible production economies.

As hereinbefore mentioned, the foils are wrapped around the respective conduits and the stack segments are completed by installing the casings and the transverse flanges. The individual male couplings are mated with the respective female couplings on each next adjacent stack segment before these joints are secured. The flange, casing and spiral roll of foil on each segment is moved into abutting relation with the transverse flange on the adjacent stack segment by pushing the integral insulation in the direction of the arrow 57 shown in FIG. 2. The strip 61 is wrapped around this joint and fixed in place. This assembly procedure is repeated in order to assemble the stack structure within the building. The stack segments 11 through 15, inclusive, are accommodated to the specific dimensions of a particular installation through the use of stack segments 24 and 25. The lengths of the segments 24 and 25 are tailored in the field to match the needs of each specific stack structure.

As shown in FIG. 1 of the drawing, the horizontal span of the stack is suspended from an overhead beam or the like through an array of sheet metal support straps 86, 87, and 90. It also should be noted that several spaced sheets of foil can be wrapped about the outer surface of the conduit to meet the requirements of a particular installation. In this respect, the individual sheets can be staggered relative to the outer surface of the conduit. Illustratively, for a two-sheet construction, the individual sheets might commence their respective spirals 180° from each other on the outer surface of the conduit.

The embodiments of the invention in which an exclusive property or privilege is claimed are defined as follows:

1. A stack comprising a plurality of stack segments, each of said stack segments having a centrally disposed generally cylindrical conduit, a plurality of foils, each of said foils being individual to a respective one of said conduits, at least one foil wound at least twice about the outer surface of at least one of said conduits in a generally spiral path to produce a plurality of layers, each of said layers in said spiral winding being spaced from the next adjacent layer, said conduits each having at least one transverse end thereof tapered to mate with and engage the transverse end of the next adjacent conduit, at least one expansion joint in communication with said stack segments, said expansion joint having two axially aligned conduits that are axially spaced from each other, a collar bridging across said conduits and said spacing therebetween, said collar being secured to only one of said conduits, another foil wrapped around the outside of said conduits and said collar in a spiral path into a roll of said another foil, each layer of said another foil being spaced a predetermined distance from adjacent layers thereof, and a casing extending beyond the extremities of said foil roll.

* * * * *